Figure 1:
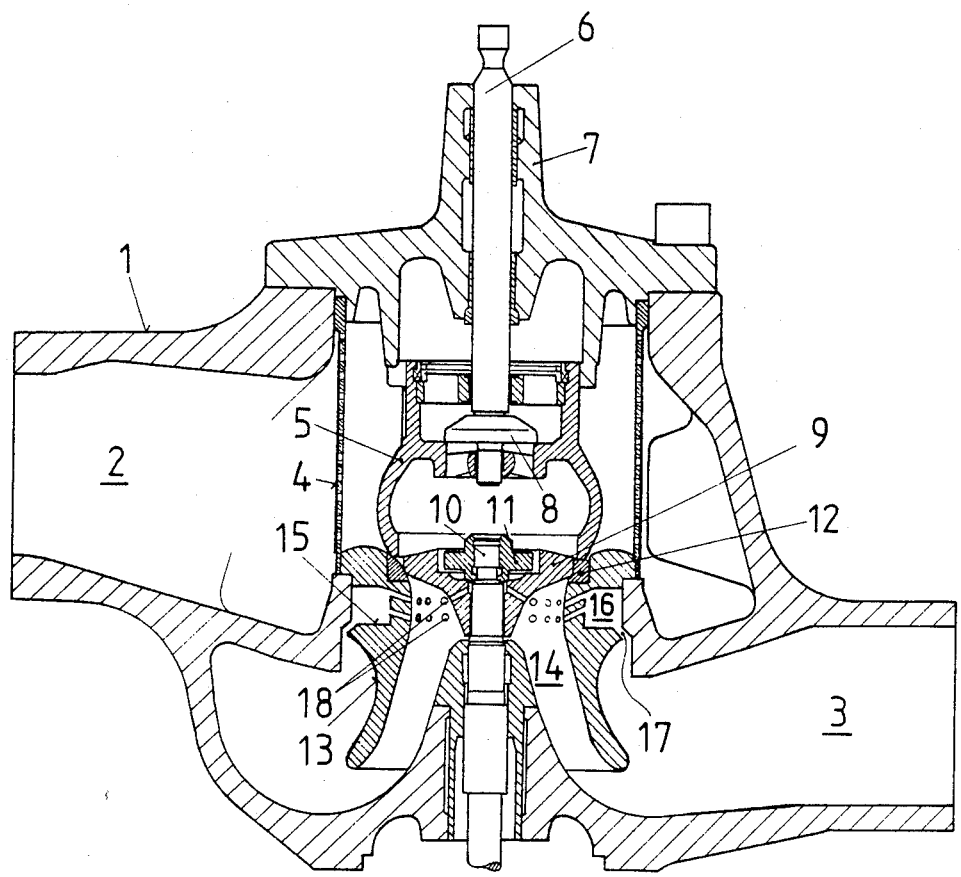

United States Patent [19]

Keller

[11] Patent Number: 4,512,548
[45] Date of Patent: Apr. 23, 1985

[54] VALVE WITH A DEVICE FOR THE ATTENUATION OF ACOUSTIC VIBRATIONS SELF-EXCITED BY THE WORKING MEDIUM

[75] Inventor: Jakob Keller, Killwangen, Switzerland

[73] Assignee: BBC Brown, Boveri & Company, Limited, Baden, Switzerland

[21] Appl. No.: 571,648

[22] Filed: Jan. 19, 1984

Related U.S. Application Data

[63] Continuation of Ser. No. 239,588, Mar. 2, 1981, abandoned.

[30] Foreign Application Priority Data

Feb. 28, 1980 [CH] Switzerland .......................... 1587/80

[51] Int. Cl.³ .............................................. F16K 1/34
[52] U.S. Cl. .................................... 251/124; 251/118; 181/269
[58] Field of Search ............ 251/118, 124, 119, 625.3, 251/630.14, 630.15; 138/44; 181/269, 255, 265; 415/DIG. 1

[56] References Cited

U.S. PATENT DOCUMENTS 2,406,243  8/1946  Newton et al. ..................... 251/118
3,250,342  5/1966  Petry ............................... 251/124 X

FOREIGN PATENT DOCUMENTS 990615   6/1976  Canada .
1003727  11/1977  Canada .
2334576  1/1975  Fed. Rep. of Germany ...... 251/118

Primary Examiner—Arnold Rosenthal
Attorney, Agent, or Firm—Burns, Doane, Swecker & Mathis

[57] ABSTRACT

A valve includes a diffuser for the recovery of static pressure energy. The point of flow separation is stabilized by introducing, into the region where the flow separation point can occur, a volume of the working medium from a portion of the valve having a higher pressure than such region. By stabilizing the flow separation point against vibration, resulting noise is minimized.

4 Claims, 4 Drawing Figures

VALVE WITH A DEVICE FOR THE ATTENUATION OF ACOUSTIC VIBRATIONS SELF-EXCITED BY THE WORKING MEDIUM This application is a continuation of application Ser. No. 239,588, filed Mar. 2, 1981, now abandoned.

The present invention concerns a valve with a device for the attenuation of acoustic vibrations self-excited by the working medium, according to the preamble of claim 1.

In valves, wherein following the restricting annular space formed by the seat of the valve and the closing body of the valve, a diffuser is provided for the recovery of pressure energy, there are frequently encountered certain states of flow wherein diffusor vibrations are generated. They are the result of the fact that the point at which the flow of the working fluid separates in the diffuser reacts in a highly sensitive manner to pressure disturbances and vibrates in the process within a certain range. The effect is particularly strong on convex walls, to which the flow may be periodically attached by suction. A similar phenomenon may also occur if the pressure following the restricting cross section is substantially lower than the critical pressure. In this case, the Prandtl-Meyer angle may be of a magnitude such that the flow may attach itself to the wall again, even after a separator edge in the diffusor. Here again, there exists a definite pressure ratio at which the separation point reacts to pressure variations with a high sensitivity.

It is the object of the present invention, as defined in the characteristic clause of claim 1, to extensively suppress the vibration associated with the abovedescribed phenomean, said vibration generating a disagreeable noise.

Figure 2:
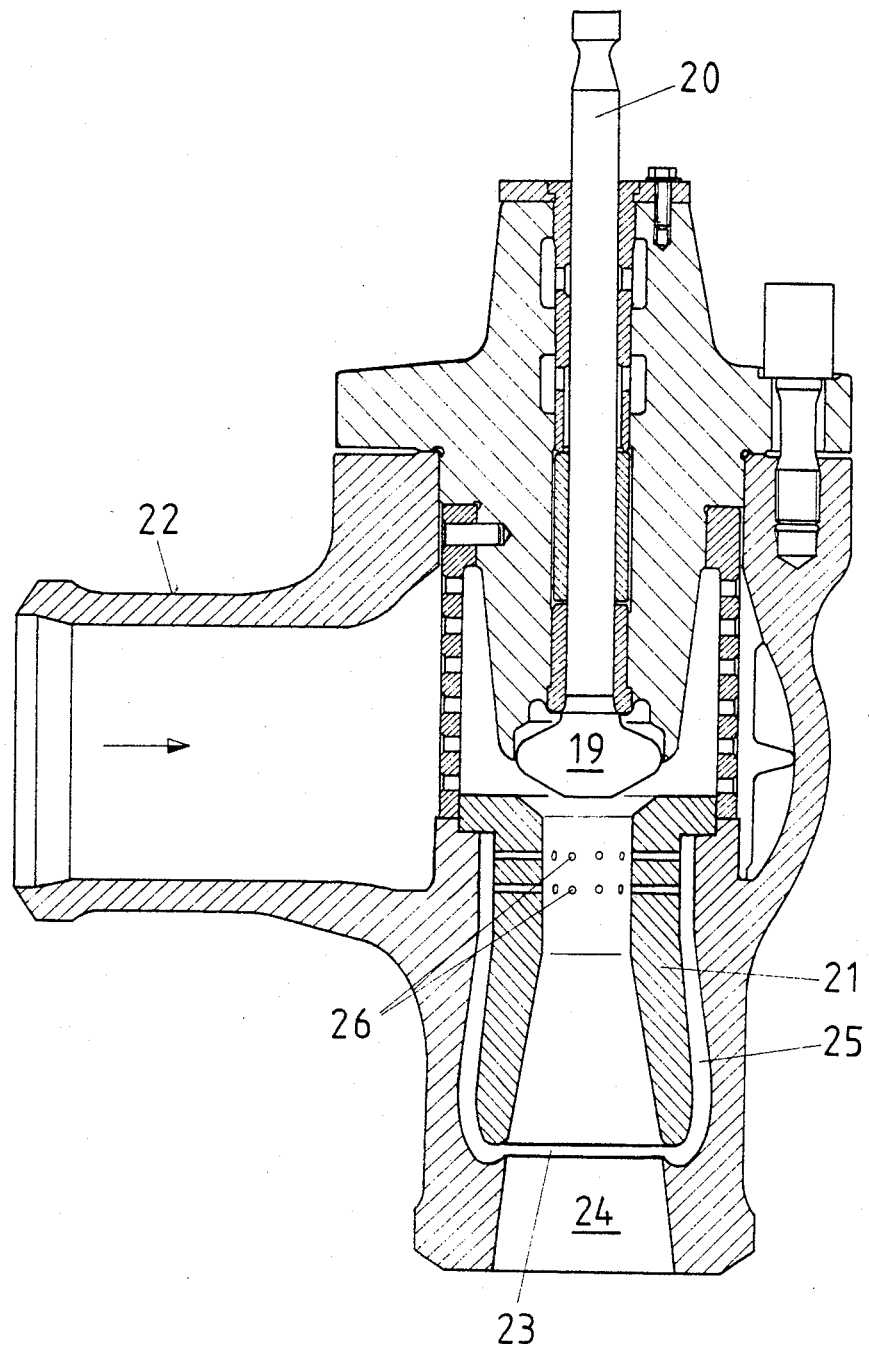

The object of the invention shall be described hereinafter in more detail with the aid of the examples of embodiment represented in the drawing. In the drawing:

FIG. 1 shows a first form of embodiment of a valve according to the invention,

FIG. 2 a second form of embodiment of a valve according to the invention, and

Figure 3:
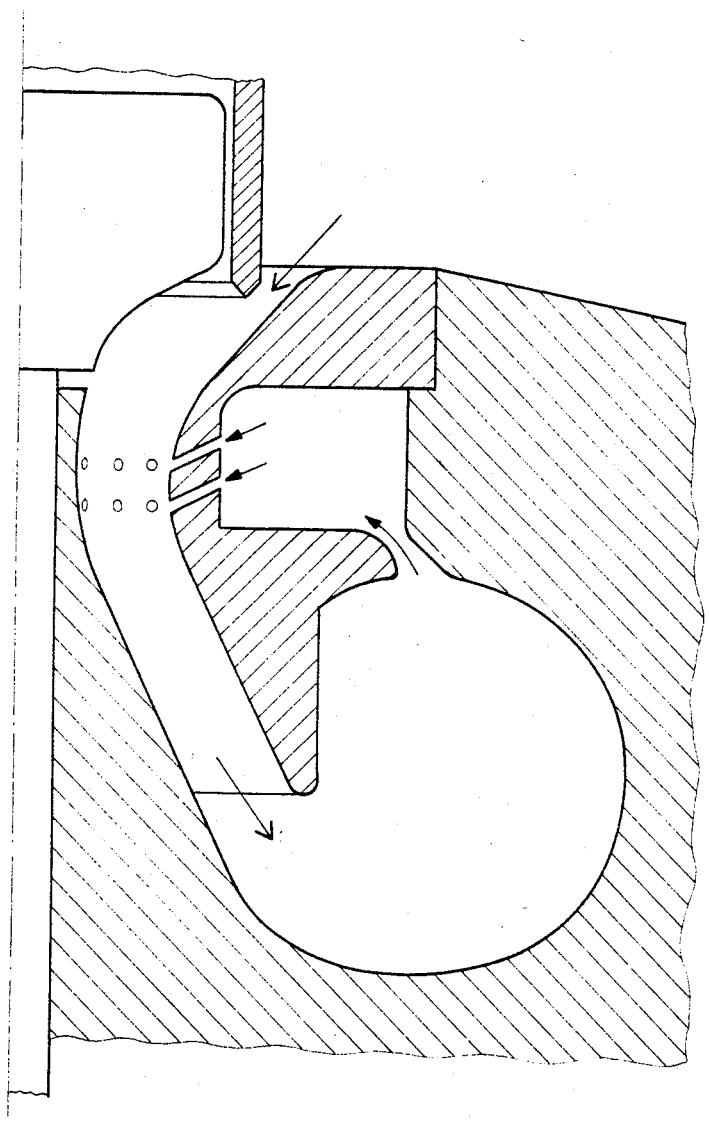
Figure 4:
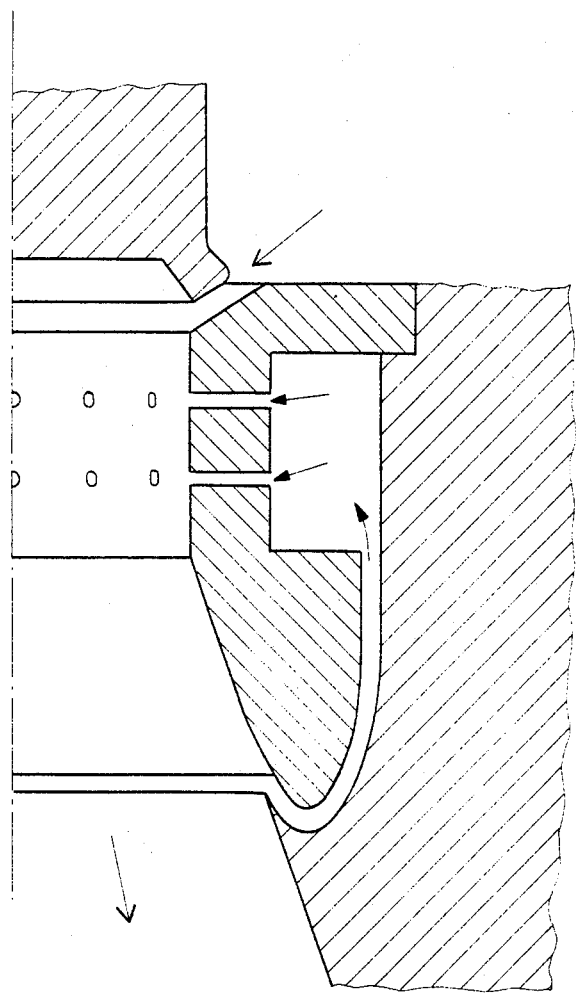

FIGS. 3 and 4 two different forms of embodiment of details of such valves, said details being essential for the invention.

FIG. 1 represents a rapid acting control valve for steam. The valve housing 1 has an inlet port 2 and an outlet port 3. In the direction of the flow after the inlet port 2 and a steam screen 4, there is a governor bell 5, which, together with an actuating spindle 6, is contained in a flange housing 7. A lifter valve 8 mounted on the spindle 6, serves in a known manner to facilitate the opening process.

Coaxially within the governor bell 5, there is a rapid action valve body 9, the spindle 10 of which is bearingly supported in the lower part of the housing. The spindle 10 carries on its upper end a lifter valve 11 to facilitate the opening process.

A common valve seat ring 12 is provided for the seating surfaces of the two valve bodies 5 and 9, said ring being disposed within a diffuser body 13. The latter has, at its outer circumference in the area of the narrowest cross section of the diffuser channel 14, an annular groove 15, forming an annular chamber 16 together with the adjacent bore wall of the housing 1. The external contour of the diffuser body 13 is such that the chamber 16 is connected by means of an annular slit 17 with the outlet port 3. Thus a flow may be established to the chamber 16, as the pressure in the outlet port 3 is higher during operations as the pressure at the narrowest point of the diffuser channel 14 within the area of the vertical extent of the annular chamber 16.

The annular chamber is conductingly connected by means of two rows of holes 18, arranged in a uniform distribution over the circumference and having their openings in the area of the narrowest cross section of the diffusor channnelt, with said diffusor channel. It is the purpose of the holes 18 to effect the fixation of the abovementioned point of separation in the diffuser, in order to prevent the vibration of the point of separation and the acoustic phenomena associated with it. This is obtained by means of a secondary inlet flow in the diffusor space, by blowing a volume of the working medium from the annular chamber 16, wherein as explained hereinabove, the pressure in operation is higher than in the area of the narrowest diffusor cross section, through the holes 18.

A possible embodiment of the characteristics of the invention in a simple control valve is shown in FIG. 2. The control valve body 19 and the spindle 20 here are located upstream from the valve seat ring of the diffusor body 21. The lower end of said diffusion body forms with an expansion in the lower part of the valve housing 22 an annular slit 23, connecting the outlet port 24 with the annular space 25, bounded by the external surface of the diffusor body 21 and the expansion of the valve body 22 surrounding said diffusor body at a distance. The upper part of said annular space 25 is again connected by means of two rows of holes 26, uniformly distributed over the circumference of the diffusor, with the area of the narrowest cross section of the diffusor channel. The stabilizng effect on the position of the point of separation is the same as in the first-described valve.

FIGS. 3 and 4 show in a schematic representation, possible variants of the embodiment according to the invention in the area of the diffusor body for the valves of FIGS. 1 and 2. It should be noted generally, that the annular spaces 16, 25 from which flow energy is being conducted to the area of flow separation through the holes 18 and 26, respectively, must not necessarily be as voluminous as shown in FIGS. 1, 3 and 4, Rather, small spaces or even bores connecting the outlet port of the valve or a point located downstream from the restriction of the diffuser channel, with the point of separation, are sufficient.

Depending on the conditions of flow, the number of holes or rows of holes may be different.

The precondition of the functioning of the device obviously is that the pressure (as in the examples presented) at the location where the medium to be introduced to the point of separation is diverted, must be higher than at said point of separation.

What is claimed is:

1. In a fluid valve of the type comprising a housing, a valve seat surrounding an opening, a closure for the seat to close-off said opening, and a diffuser including a wall having a generally annular surface therein forming a diffuser channel disposed downstream of said seat for recovering pressure energy in the working medium, the improvement comprising conduit means fluidly intercommunicating a region within said diffuser channel where a flow separation point occurs and a portion of said valve where pressure is higher than at said region during operation, to stabilize said flow separation point and minimize resulting noise, said conduit means comprising an annular passage surrounding said diffuser and a plurality of holes in said diffuser wall surface and communicating with an area of narrowest cross-section of said diffuser channel, said area of narrowest cross-section having a cross-section no larger than the cross-section of said opening of said seat, said diffuser channel being disposed in contiguous relationship with said opening so that no gap is formed therebetween, the length of said diffuser channel being longer than a diameter of said narrowest cross-section.

2. A valve according to claim 1, wherein said holes extend at right angles to a longitudinal axis of said diffuser channel.

3. A valve according to claim 1, wherein said holes are inclined at an acute angle relative to the direction of flow of working medium through said diffuser, said holes being inclined in the direction of flow.

4. A valve according to claim 1, wherein said diffuser channel extends continuously from said valve seat.

* * * * *